Dec. 29, 1942.  S. B. HULVEY ET AL  2,306,807
BORING SAW
Filed July 29, 1940
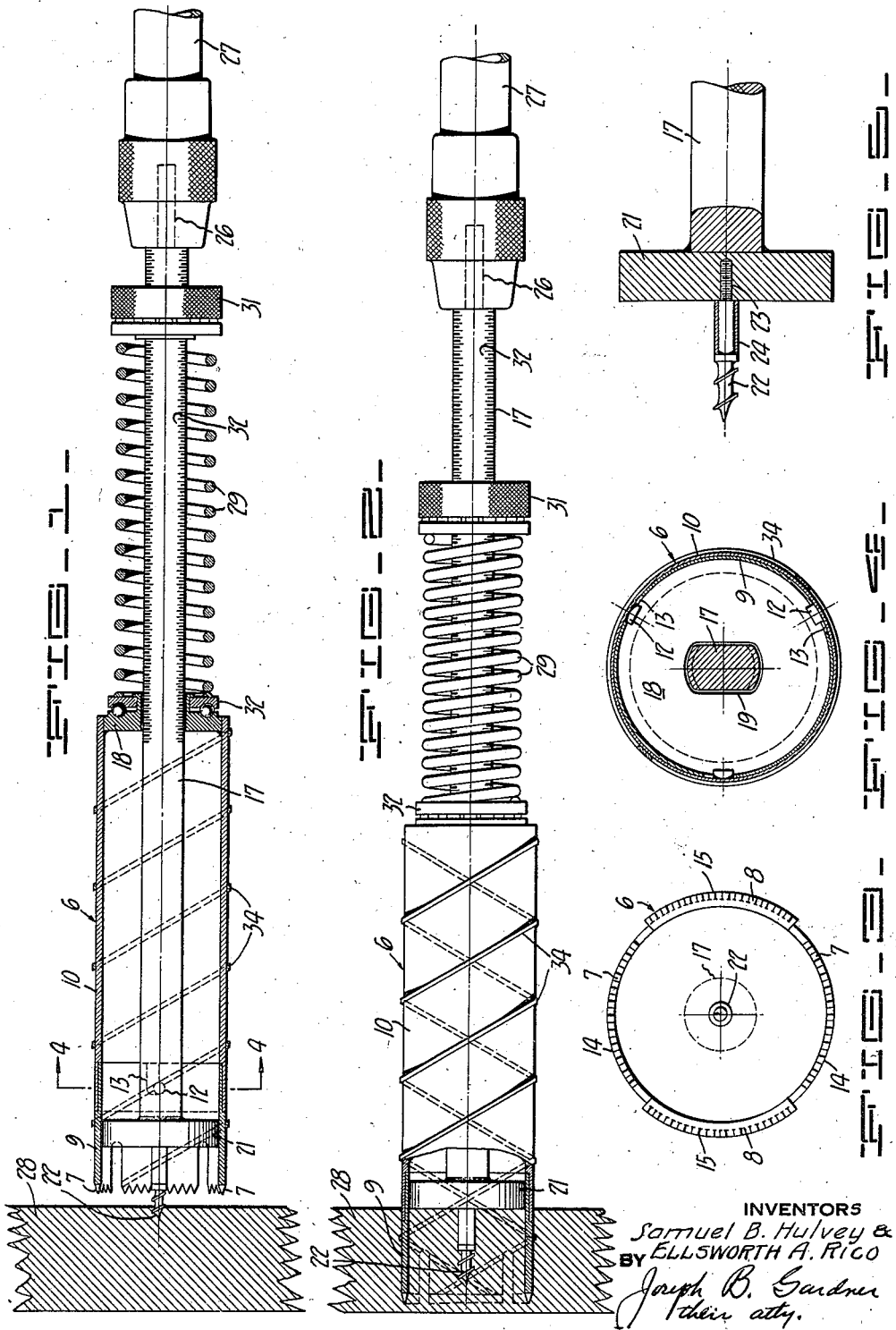
INVENTORS
Samuel B. Hulvey &
BY Ellsworth A. Rico
Joseph B. Gardner
their atty.

Patented Dec. 29, 1942

2,306,807

UNITED STATES PATENT OFFICE 2,306,807

BORING SAW

Samuel B. Hulvey and Ellsworth A. Rico,
San Francisco, Calif.

Application July 29, 1940, Serial No. 348,179

1 Claim. (Cl. 145—120)

The invention relates to a rotary saw designed for cutting holes or openings of a size much larger than that ordinarily permitted with the use of a drill.

Heretofore saws of the type referred to have in general consisted of a hollow cylinder, one end of which is formed with teeth for effecting the cutting operation, while the other end is provided with some means for attachment to the device for effecting rotation of the cylinder. The toothed end of the cylinder is formed hollow so that the portion of the work operated upon within the toothed circumference of the saw may enter and advance through the cylinder as the cutting operation progresses. As a means of centering the cutting cylinder in the work, usually a bit is secured to the attaching end of the cylinder from which it extends axially through the cylinder with the point thereof located outwardly of the saw teeth. The design of saw thus described has several disadvantages, and particularly in that frequently the cutter during advancement through the work will move out of concentricity with the drill, thereby not only unduly straining the parts of the device, but resulting in an incorrectly cut hole or bore. It is one of the principal objects of our invention to eliminate this disadvantage, and in accordance therewith, we provide as a part of the device, a means which will provide a bearing for the cylinder directly at the point at which the teeth enter the work. Such means will guide the cutter practically entirely independent of the centering bit but at the same time insure a cut in conformity with the centering or locating requirements imposed by the bit.

Another feature of the invention is the provision of means which will cause the saw to penetrate the work with a desired pressure irrespective of the force being applied by the operator against the work with the device.

A further feature of the invention is that the operator may cause the cutting operation to start in any relation or time with respect to the entry of the bit in the work.

A still further object or feature of the device is the provision of a particularly effective means for expelling the saw dust from the cutter and work during the sawing operation.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim.

Referring to said drawing:

Figure 1 is a longitudinal sectional view of the saw of our invention, showing same positioned for the initial entry into the work.

Figure 2 is a view similar to Figure 1, but showing the parts after the cutting operation has been initiated.

Figure 3 is an end elevation of the device as viewed from the cutter end.

Figure 4 is a cross-sectional view taken on the line 4—4 of Figure 1.

Figure 5 is an enlarged sectional view of the centering bit and cutter-cylinder bearing or guide.

In the form of our invention illustrated in the drawing, the device includes a hollow cylinder 6 which is open at one end and has provided thereat a series of teeth 7 and 8. The cylinder 6 is preferably made in two sections 9 and 10, which are formed with outer and inner reduced portions which interfit telescopically and permit of corresponding circumferential interiors and exteriors for the sections. A pin and slot 12 and 13 provided on the sections afford a bayonet connection between the sections so as to permit the ready attachment or detachment of the sections when desired. Preferably a number of sets of the pin and slot aforesaid are distributed about the cylinder so as to insure a secure and firm connection between the sections. The section 9 which has the teeth thereon is desirably formed of high grade steel, and since it is detachable from the section 10, the cutter portion of the cylinder may be readily replaced, and at the same time the section 10 may be formed of a less expensive material. Preferably and as here shown, the teeth 7 and 8 are provided on spaced segments 14 and 15, the segments 14 having the teeth 7 being alternately disposed with respect to the segments 15 and arranged in diametrical offset relation with respect thereto.

The cylinder is arranged for mounting upon a spindle 17, and in a manner which will permit relative longitudinal movement thereof upon the spindle, but prevent relative rotative displacement thereon. At the end of the cylinder opposite of that having the teeth, is provided an end wall 18 which is fixed to the cylinder and is formed with an opening 19 which conforms substantially in shape and size with the cross-sectional outline of the spindle. The latter as shown in Figure 4, is formed of more or less elliptical shape in cross section, so that engagement of the wall and spindle prevents relative rotation but permits relative longitudinal displacement.

At the forward end of the spindle is provided a collar 21 whose outer circumference corresponds with the inner circumference of the cylinder, whereby the latter may fit over the collar and be guided thereon during longitudinal movement of the cylinder relative to the spindle. It will be clear that with the cylinder provided with a bearing with the spindle at each end of the cylinder, all portions of the cylinder will be maintained in even relation with the spindle and no opportunity of the one binding on the other will be possible.

Positioned at the forward side of the collar or guide 21 is a drill bit 22 which is centrally disposed in respect thereto so as to be axially aligned with the spindle. Between the screw portion 23 of the bit and the collar is preferably provided a sleeve 24 which may rotate upon the bit, and has its outer circumference approximately the same as the corresponding circumference of the screw portion. Preferably, the distance between the point of the bit and the collar is such that the point of the bit may protrude appreciably beyond the teeth while the collar remains retracted inwardly of the teeth.

The spindle, as will be clear from Figures 1 and 2, is considerably longer than the cylinder, and is formed at its free end with a shank 26 or the like to permit attachment of the spindle with a brace or, as here indicated, the shaft 27 of a motor or other source of rotation by hand or power.

As will be clear when it is desired to bore a hole with the device, the point of the bit is entered into the work, here designated by the numeral 28, and the spindle caused to rotate whereby the collar will be drawn up against the side of the work. The cylinder of course will rotate with the spindle, and in order to effect the cutting operation, the cylinder will have to be advanced forwardly along the spindle, that is over the collar and the bit. Means are therefore provided for causing the cylinder to progressively advance over the spindle and into the work, while the collar remains held against the work. Preferably such means provide for moving the cylinder by resilient pressure, and to this end there is provided about the spindle, a helical spring 29 which is interposed between the end wall 18 and a nut 31. The spindle is formed on its shorter side portion with screw threads 32, and such threads are engaged by the nut 31. The threads are desirably left handed so that if the nut is held from rotating while the spindle is rotated on the usual right handed manner, the nut will move forwardly so as to force the spring against wall 18. In this manner, when in the use of the device, the teeth are to be brought into engagement with the work, upon the compression of the spring by the nut, the cylinder will be urged against the work and the teeth will be caused to steadily advance through the work until the cutting operation is completed. It will be understood of course that the operator will hold the nut from rotating just long enough to insure sufficient compression of the spring to provide for the full length of movement of the cylinder over the spindle to complete the cutting operation. Preferably a ball-bearing thrust plate 32 is provided on the wall 18 and nut so as to reduce friction when the nut is moved on the spindle. As before explained the sleeve is rotatable on the bit, and a smooth and fixed relation with the work will be maintained by the sleeve notwithstanding that the stripping of the threaded portion of the work will be occasioned by the rotation of the bit when advancement thereof ceases after the collar contacts the work.

As a means of expelling the sawdust from around the cylinder as the teeth progress through the work, we provide on the outer side of the cylinder, a double spiral rib 34. The latter is preferably formed of two parts, that is one for the section 9, and the other for the section 10. The ribs as will be noted, extend for the full length of the cylinder and the arrangement of the ribs is such that as the cylinder is advanced through the work, the sawdust particles will be conveyed backward from between the work and the cylinder and thus leaves the teeth clear and effective for efficient cutting.

After the cutting operation has been completed, to remove the device it is merely necessary to retract the spindle until the collar abuts the wall 18. The further retraction of the spindle will then draw the cylinder with it until the latter is free of the work.

We claim:

A boring saw comprising, a spindle adapted to be rotated and provided with a work engaging portion at the forward end thereof including a forwardly projecting shank and a bit at the front of said shank, a cylindrical collar mounted on said spindle at the base of said shank, a bearing sleeve rotatably carried on said bit shank between said bit and said collar and having a diameter approximately equal to the cutting diameter of said bit for journaling said bit shank in the work, a cylindrical member slidably but non-rotatably mounted concentrically on said spindle in engagement with said collar with an open end thereof normally adjacent said bit and being provided with cutting teeth, a nut threaded on said spindle in spaced relation to the opposite end of said cylindrical member, and a helical spring surrounding said spindle and compressed between said nut and said cylindrical member to resiliently advance the latter along said spindle.

SAMUEL B. HULVEY.
ELLSWORTH A. RICO.